United States Patent [19]
Guidry et al.

[11] Patent Number: 4,571,144
[45] Date of Patent: Feb. 18, 1986

[54] TAILGATE RAMP FOR ATTACHING TO THE TAILGATE OF A TRUCK

[76] Inventors: Donald C. Guidry, 1233 Haig St., Baton Rouge, La. 70802; Ronald H. Guidry, 12010 Section Rd., Port Allen, La. 70767

[21] Appl. No.: 520,496

[22] Filed: Aug. 4, 1983

[51] Int. Cl.<sup>4</sup> ............................................. B65G 67/02
[52] U.S. Cl. ...................................... 414/537; 182/48; 182/157
[58] Field of Search ................. 414/537; 14/69.5, 71.1, 14/72.5, 45, 73; 182/1, 48, 157, 158

[56] References Cited

U.S. PATENT DOCUMENTS

| | | | |
|---|---|---|---|
| 196,679 | 10/1877 | Lane | 182/157 |
| 713,561 | 11/1902 | Doyen | 14/45 |
| 960,022 | 5/1910 | Kelemen et al. | 14/45 |
| 3,352,440 | 11/1967 | Wilson | 296/61 X |
| 3,462,170 | 8/1969 | Smith et al. | 182/157 X |
| 3,642,156 | 2/1972 | Stenson | 296/61 X |
| 3,713,553 | 1/1973 | Curtis et al. | 296/61 X |
| 3,756,440 | 9/1973 | Raap et al. | 296/61 X |
| 3,976,209 | 8/1976 | Burton | 296/61 X |
| 4,527,941 | 7/1985 | Archer | 414/537 |

FOREIGN PATENT DOCUMENTS 703415 12/1979 U.S.S.R. ................................. 14/71.1

OTHER PUBLICATIONS

Brochure for the "Versa-Ramp", Best Manufacturing Co., Inc., Jonesboro, AR.

Primary Examiner—Robert J. Spar
Assistant Examiner—Stuart J. Millman
Attorney, Agent, or Firm—David L. Ray

[57] ABSTRACT

A foldable loading ramp for a truck having a tailgate. The ramp includes a plurality of ramp sections. The top section of the ramp is pivotally connected to the tailgate, and is attached to an adjacent section by two pivoting bars connected to the sides of the top section and to the sides of the adjacent section. One of the bars is connected to the middle of the top ramp section and the end of the adjacent ramp section. The other bar is attached to the end of the top ramp section and the middle of the adjacent section, thereby allowing the ramp to be folded into a compact bundle inside the tailgate when not in use.

4 Claims, 3 Drawing Figures

TAILGATE RAMP FOR ATTACHING TO THE TAILGATE OF A TRUCK

BACKGROUND OF THE INVENTION

The present invention relates to a ramp for loading cargo onto the bed of a truck which is easily attachable to the tailgate of a truck. More particularly the device of the invention is related to a foldable ramp attachable to the tailgate of a pickup truck including a plurality of ramp sections connected together by a scissors-type linkage.

Pickup trucks and other trucks employing tailgates are widely used throughout the world to transport many different types of cargo. Some of the cargo being transported may be light weight and easily loaded onto the truck by an individual of average strength. Other types of cargo such as three-wheel all-terrain vehicles, motorcyles, small tractors and the like cannot be easily loaded by an individual onto the bed of a pickup truck or other trucks utilizing conventional tailgates. It is common for an individual truck owner or driver to transport his motorcycle or three-wheel all-terrain vehicle to a remote area where no one is available to assist the driver in loading and unloading the vehicle.

Various loading ramps are known in the prior art which can be utilized to assist the driver in loading and unloading such vehicles from a pickup truck having a tailgate. Patents pertinent to such loading and unloading ramps are U.S. Pats. Nos. 3,352,440; 3,642,156; 3,713,553; 3,756,440; and 3,976,209. However, none of these patents employ a scissor-type linkage for connecting the multiple sections of the ramp together.

SUMMARY OF THE INVENTION

In accordance with the present invention there is provided a foldable loading ramp for a truck having a tailgate. The ramp includes a plurality of ramp sections. The top section of the ramp is pivotally connected to the tailgate, and is attached to an adjacent section by two pivoting bars connected to the sides of the top section and to the sides of the adjacent section. One of the bars is connected to the middle of the top ramp section and the end of the adjacent ramp section. The other bar is attached to the end of the top ramp section and the middle of the adjacent section, thereby allowing the ramp to be folded into a compact bundle inside the tailgate when not in use.

The ramp of the present invention has several advantages over the ramps of the prior art. One advantage is that the ramp sections may be made smaller than the tailgate, so that the ramp sections do not extend upwardly above the tailgate when the ramp is folded behind the tailgate when not in use.

Another advantage of the ramp of the invention is that the ramp may be employed with a tailgate which is in a horizontal position since multiple sections of the ramp can be utilized to extend from a tailgate which is several feet above the ground. Thus, it is not necessary to have the tailgate slanting downwardly in order for the ramp of the invention to reach the ground.

An additional, important, advantage of the ramp of the present invention is that the ramp folds into a compact package or bundle inside the tailgate of the truck when not in use. Thus, the ramp does not take up a lot of storage space, leaving more space in the truck for carrying cargo, and fits flush or below the top of the tailgate, so as not to interfere with any covers or campers mounted on top of the sides of the truck bed.

Another advantage of the invention is that it is light weight and easily foldable into the operating position. The ramp employs skid resistant, metal grating which facilitates easy loading and minimizes slippage or skidding while loading.

A further advantage of the invention is that in one embodiment, the invention may be entirely disconnected from a tailgate of a truck by removing two nuts.

BRIEF DESCRIPTION OF THE DRAWINGS

The above advantages and other features of the invention will be apparent during the course of the following detailed description and by reference the following drawings in which.

DESCRIPTION OF THE PREFERRED EMBODIMENTS

Figure 1:
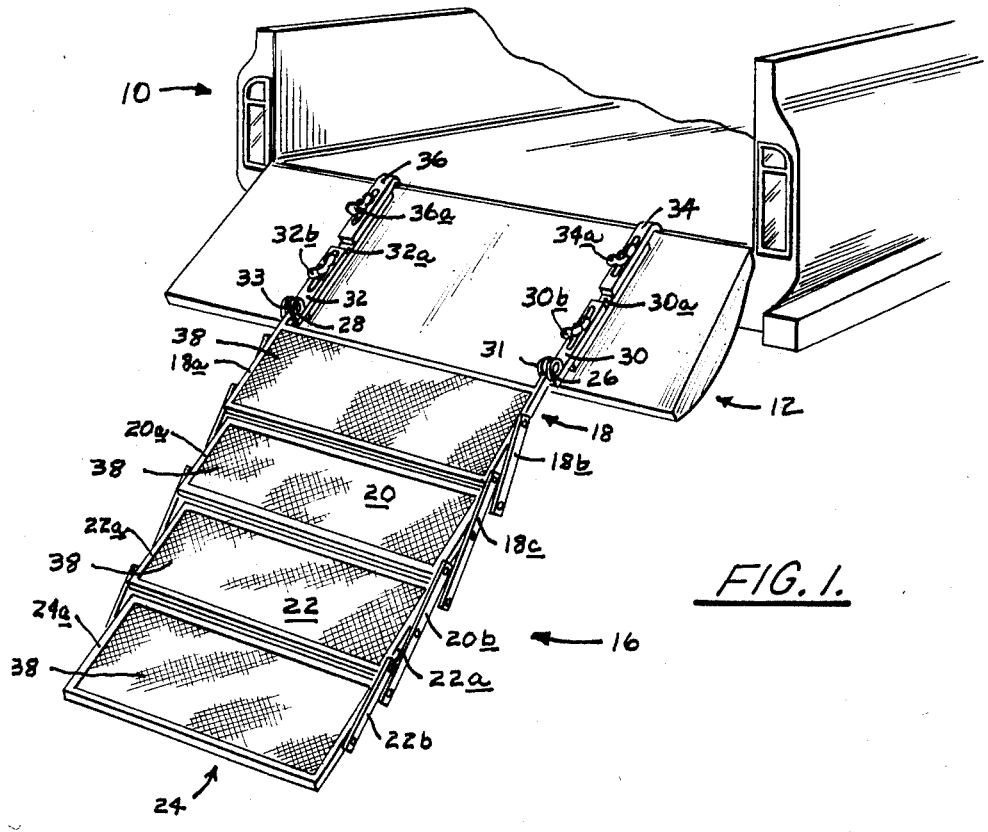
FIG. 1 is a partially cut-away, perspective view of the loading ramp of the invention attached to the tailgate of a truck.

Referring now to the drawings, and in particular to FIG. 1, a truck is generally indicated by the numeral 10. Truck 10 has tailgate 12 attached thereto in any conventional manner. Commonly truck tailgates are connected to the body of the truck by hinges (not shown). Furthermore, it is common for a truck tailgate to have support cables, bars or chains connected thereto to support the tailgate in a horizontal position when desired. Such cables, bars, or chains are not shown in the drawings since they are not necessary, but examples of such devices are shown in U.S. Pat. No. 3,713,553, FIG. 1, and U.S. Pat. No. 3,976,209, FIG. 1, which is hereby incorporated by reference.

The foldable ramp of the present invention is generally indicated by the numeral 16. The ramp of the invention includes a top section generally indicated by the numeral 18 and a bottom section generally indicated by the numeral 24. A second section generally indicated by the numeral 20 is located adjacent to the top section and a third section, generally indicated by the numeral 22 is located adjacent to section 20 and the bottom section 24.

It will be understood that the number of sections of ramp 16 may be varied according to the desired dimensions of the sections and the height of the tailgate above the ground. It is preferred that the bottom of the ramp 16 rests upon the ground or floor to support heavy loads. Some trucks having the body raised above the axle and/or oversized tires may have tailgates which are significantly higher than standard, conventional trucks commonly utilized. Thus, in such vehicles more sections may be needed than for conventional trucks or the sections may be merely increased in width to extend the desired distance to the ground, it being understood that the width of the section should be less than the tailgate width if it is desired to keep the sections of the ramp from protruding upwardly above the top of the tailgate when the tailgate is closed.

The top ramp section 18 is pivotally pinned by pins 26 and 28 to connecting members 30 and 32. Connecting members 30 and 32 have hinge portions 31 and 33 for receiving pins 26 and 28 and may be connected to tailgate 12 by any desired means such as welding, bolting or the like. In the embodiment shown in the drawings, the connecting members 30 and 32 are bolted to a second member 30a and 32a which can be welded or bolted to the tailgate to permit the ramp to be easily removed from the tailgate by removing wing-nuts 32b and 30b. Conventional nuts may be used. If desired, a bottom support member 34 and 36 can be utilized to anchor support members 30a and 32a to the bottom of tailgate 12. Support members 34 and 36 are held in place by nuts 34a and 36a. It should be emphasized however, that the ramp of the invention may be connected by any desired manner to a tailgate as long it is pivotally connected to the tailgate by hinges or pins 26 and 28.

As can be seen in the drawings, each of the sections 18, 20, 22 and 24 are generally rectangular in shape, as is the conventional tailgate 12. A rectangular shape is preferred, although the sections could be square if desired. The sections of the ramp are generally aligned so that their longer sides are parallel to the longer side of tailgate 12.

Each of the ramp sections preferably have an expanded wire grating 38 thereon to serve as a load supporting platform, although a flat wooden or metal sheet could be used. Such wire grating is preferred because the wire grating is light and skid resistant, while at the same time being quite strong. The wire grating 38 may be connected to the sides of the ramp sections by any method well known in the art such as welding, bolting or the like, although welding is preferred.

To connect the various ramp sections together, a series of bars are pivotally pinned to the shorter parallel sides 18a, 20a, 22a and 24a of the ramp sections 18, 20, 22 and 24. A short bar 18b is pinned to the center of side 18a and to the upper end of the side 20a by pins 40 and 42, respectively. A second bar 18c which is longer than the short bar 18b is pinned to the lower end of side 18a, to the middle of the side 20a, and to the upper end of the side 22a by pins 44, 46, and 48, respectively. The lower end of ramp section 20 is connected to the middle of ramp section 22 and the upper end of ramp section 24 by bar 20b which is pinned to the lower end of the side 20a, to the middle of the side 22a, and to the upper end of the side 24a by pins 50, 52 and 54 respectively. The lower end of ramp section 22 is connected to ramp section 24 by bar 22b which is pinned to the lower end of side 22a and to the middle of the side 24a by pins 56 and 58 respectively.

The bars utilized in pivotally joining or pinning the various ramps sections together can be pinned or pivotally connected by any means well known in the art. The pins shown in the drawings are threaded on one end so that can be connected to the ramp section and bar by nuts and have heads on the other end. The pins are received in holes drilled in the bars and sides of the ramp section as is well known in the art. Preferably the pins are welded to the sides 18a, 20a, 22a, and 24a with their ends extending outwardly from the sides of the ramp sections so that the pins can be easily inserted through holes in the bars and nuts threaded thereon.

As can be seen in the drawings, each of the bars 18b, 18c, 20b, and 22b are pinned to the outside of the respective ramp sections. In the position shown in FIG. 1, the bars rest against the edges of adjacent bars to prevent the ramp from collapsing or buckling when a load is placed on the ramp.

Figure 2:
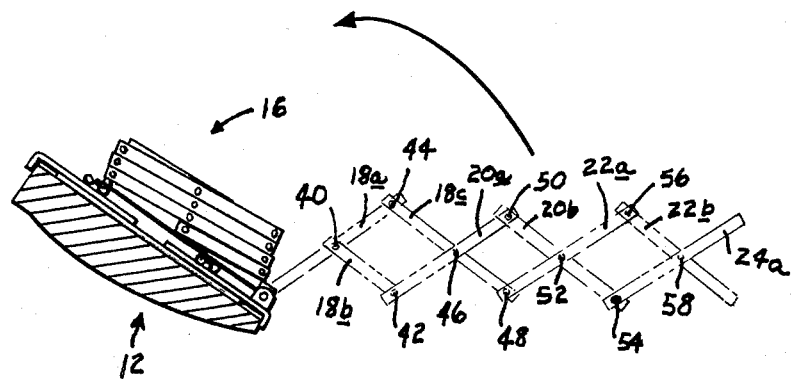
FIG. 2 is a partial cross-sectional side view of the ramp of the invention connected to a tailgate showing the ramp in the closed position and a ghosted-in view of the ramp in an extended position.
Figure 3:
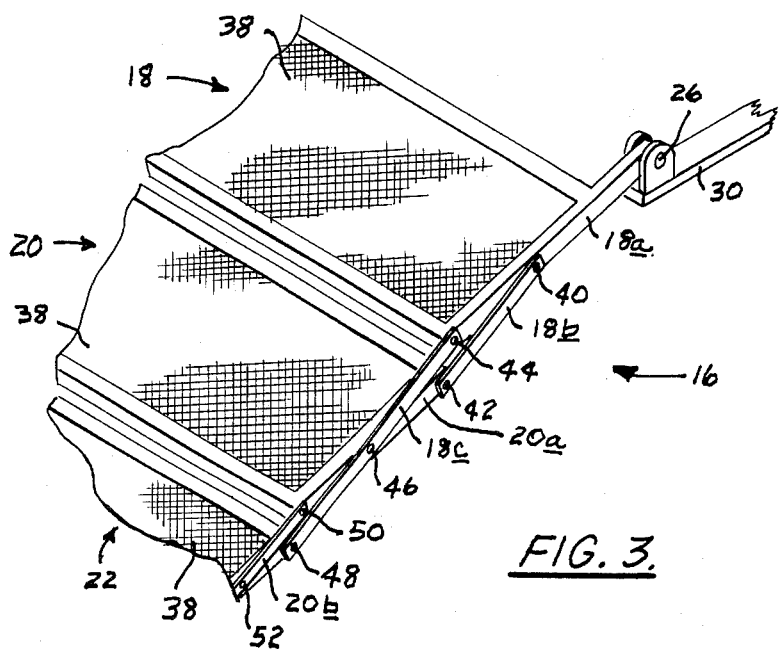
FIG. 3 is a partially cut-away, detailed view of a portion of the ramp of the invention showing the linkage of the ramp in greater detail.

As shown in FIG. 2, when the ramp is lifted above the ground to an approximatly horizontal level and forced toward the tailgate 12, the ramp sections will separate in a scissor-like fashion and fold compactly onto the tailgate 12 as shown in the left portion of FIG. 2.

The foldable ramp of the present invention can be constructed from any high-strength material such as steel, stainless steel, aluminum, and the like. Aluminum is especially desirable where it is desired to eliminate as much weight as possible from the truck. The rigid bars are preferably flat and rectangular in shape, although hollow members could be used.

Although the preferred embodiments of the present invention have been disclosed and described in detail above, it should be understood that the invention is in no sense limited thereby, and its scope is to be determined by that of the following claims.

We claim:

1. a loading ramp foldable inside of the tailgate of trucks having tailgates comprising:
   a. a truck tailgate having an inside and an outside;
   b. a first rectangular ramp section pivotally connected to the inside of said tailgate;
   c. a second rectangular ramp section pivotally connected to each side of said first ramp section by a first and a second rigid bar means,
      i. said first rigid bar means being rotatably pinned to the middle of the sides of said first ramp section and to the side of the upper end of said second ramp section;
      ii. said second rigid bar means being rotatably pinned to the side of the lower end of said first ramp section and to the middle of the side of said second ramp section;
   d. a third rectangular ramp section pivotally connected to each side of said second ramp section by said second rigid bar means and by third rigid bar means,
      i. said second rigid bar means being rotatably pinned at its lower end to the upper end of the side of said third ramp section,
      ii. said third rigid bar means being pinned to the side of the lower end of said second ramp section and to the middle of the side of said third ramp section, said rectangular ramp sections having a height less than the height of said tailgate to enable said ramp to be folded inside said tailgate without extending above said tailgate, said ramp sections having two parallel shorter sides and two parallel longer sides, said longer sides being parallel to the rear edge of said tailgate, said rectangular ramp sections having a metal grating connected to the edges thereof for supporting cargo being loaded on said tailgate, one of the longer edges of said rectangular ramp sections being adjacent to one of the longer edges of an adjacent rectangular ramp section when said foldable ramp is unfolded and extended to load cargo, said adjacent rectangular ramp sections forming a continuous inclined roadway when extended to load cargo.

2. The foldable loading ramp of claim 1 wherein a fourth rectangular ramp section is pivotally connected to each side of said third ramp section by said third rigid bar means and by fourth rigid bar means, said third rigid bar means being rotatably pinned at its lower end to the upper end of the side of said fourth ramp section, said fourth rigid bar means being rotatably pinned to the side of the lower end of said third ramp section and to the middle of the side of said fourth ramp section.

3. The foldable ramp of claim 2 wherein said ramp sections are substantially identical in size.

4. The foldable ramp of claim 3 wherein said top ramp section has means pivotally connected thereto which can be disconnected from said tailgate by removing a plurality of bolts.

* * * * *